United States Patent
Gordon

(10) Patent No.: US 11,843,479 B2
(45) Date of Patent: Dec. 12, 2023

(54) SYSTEMS AND METHODS FOR ESTABLISHING A SECURE COMMUNICATION LINK IN AN ELECTRIC POWER DISTRIBUTION SYSTEM

(71) Applicant: Schweitzer Engineering Laboratories, Inc., Pullman, WA (US)

(72) Inventor: Colin Gordon, Katy, TX (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 160 days.

(21) Appl. No.: 17/209,394

(22) Filed: Mar. 23, 2021

(65) Prior Publication Data
US 2022/0311641 A1    Sep. 29, 2022

(51) Int. Cl.
H04L 29/06    (2006.01)
H04L 12/46    (2006.01)
H04L 9/32     (2006.01)
H04L 9/40     (2022.01)
H04L 29/08    (2006.01)

(52) U.S. Cl.
CPC ............ H04L 12/4633 (2013.01); H04L 9/32 (2013.01); H04L 63/06 (2013.01); H04L 63/162 (2013.01)

(58) Field of Classification Search
CPC ....... H04L 12/4633; H04L 9/32; H04L 63/06; H04L 63/162; H04L 12/413
See application file for complete search history.

(56) References Cited

U.S. PATENT DOCUMENTS

| 7,729,276 B2 | 6/2010 | Akyol |
| 2019/0116183 A1* | 4/2019 | Hussain ................. H04L 63/08 |
| 2019/0173860 A1 | 6/2019 | Sankaran |
| 2019/0342101 A1 | 11/2019 | Hayes |
| 2020/0106719 A1 | 4/2020 | Acharya |
| 2021/0297416 A1* | 9/2021 | Gavraskar ............. H04L 67/142 |

FOREIGN PATENT DOCUMENTS

EP    3883205 A1 *    9/2021    ........... H04L 63/065

OTHER PUBLICATIONS

Sang-Yoon Chang, Yih-Chun Hu; "SecureMAC: Securing Wireless Medium Access Control Against Insider Denial-of-Service Attacks"; IEEE Transactions on Mobile Computing, Year: Dec. 2017 | vol. 16, Issue: 12 | Journal Article | Publisher: IEEE; pp. 3527-3540 (Year: 2017).*

* cited by examiner

*Primary Examiner* — Trong H Nguyen
*Assistant Examiner* — Courtney D Fields
(74) *Attorney, Agent, or Firm* — Fletcher Yoder, P.C.

(57) ABSTRACT

An intelligent electronic device (IED) of an electric power distribution system includes processing circuitry and a memory having instructions. The instructions, when executed by the processing circuitry, are configured to cause the processing circuitry to determine establishment of setup criteria to operate in a passive mode, operate in the passive mode to communicate data without initiation of a media access control security key agreement (MKA) protocol in response to determination of the establishment of the setup criteria, receive activation data during operation in the passive mode, the activation data being indicative that a media access control security (MACsec) communication link is to be established, and operate in an active mode in response to receipt of the activation data to initiate the MKA protocol to establish the MACsec communication link.

19 Claims, 10 Drawing Sheets

SYSTEMS AND METHODS FOR ESTABLISHING A SECURE COMMUNICATION LINK IN AN ELECTRIC POWER DISTRIBUTION SYSTEM

BACKGROUND

This disclosure relates to systems and methods for establishing a secure communication link between different devices of an electric power distribution system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electric power distribution systems carry electricity from a transmission system to residential communities, factories, industrial areas, and other electricity consumers. An electric power distribution system may include various intelligent electronic devices (IEDs) that may communicate with other devices of the electric power distribution system during operation of the electric power distribution system. For example, the IED may receive and/or transmit a signal and/or data in order to perform a functionality, such as to control a circuit breaker in response to electrical measurements of the electric power distribution system. Unfortunately, it may be difficult to establish a secure communication link between the IED and other devices of the electric power distribution system to enable the devices to securely communicate with one another. For example, it may be difficult and/or time consuming to establish respective secure communication links between different devices, such as configuring each device and initiating each device to establish the secure communication links.

SUMMARY

Certain examples commensurate in scope with the originally claimed subject matter are discussed below. These examples are not intended to limit the scope of the disclosure. Indeed, the present disclosure may encompass a variety of forms that may be similar to or different from the examples set forth below.

In an embodiment, an intelligent electronic device (IED) of an electric power distribution system includes processing circuitry and a memory having instructions. The instructions, when executed by the processing circuitry, are configured to cause the processing circuitry to determine establishment of setup criteria to operate in a passive mode, operate in the passive mode to communicate data without initiation of a media access control security key agreement (MKA) protocol in response to determination of the establishment of the setup criteria, receive activation data during operation in the passive mode, the activation data being indicative that a media access control security (MACsec) communication link is to be established, and operate in an active mode in response to receipt of the activation data to initiate the MKA protocol to establish the MACsec communication link.

In an embodiment, a tangible, non-transitory, computer-readable medium includes instructions. The instructions, when executed by processing circuitry, are configured to cause the processing circuitry to receive an indication to establish a media access control security (MACsec) communication link with an intelligent electronic device (IED) of an electric power distribution system, transmit activation data to the IED in response to receipt of the indication, the activation data being configured to cause the IED to transition from a passive mode in which data is communicated with the IED without use of the MACsec communication link to an active mode in which a MACsec key agreement (MKA) protocol is initiated to establish the MACsec communication link, and initiate the MKA protocol upon transmitting the activation data to establish the MACsec communication link with the IED In an embodiment, a system includes an intelligent electronic device (IED) configured to operate in a passive mode based on received setup criteria, a switch communicatively coupled to the IED, and a controller. The controller is configured to receive an indication to establish a MACsec communication link between the switch and the IED and transmit an instruction to the switch in response to receipt of the indication. The instruction causes the switch to transmit activation data to the IED to cause the IED to transition from the passive mode to an active mode to initiate a MACsec key agreement (MKA) protocol to establish the MACsec communication link based on the received setup criteria.

DETAILED DESCRIPTION

Figure 1:
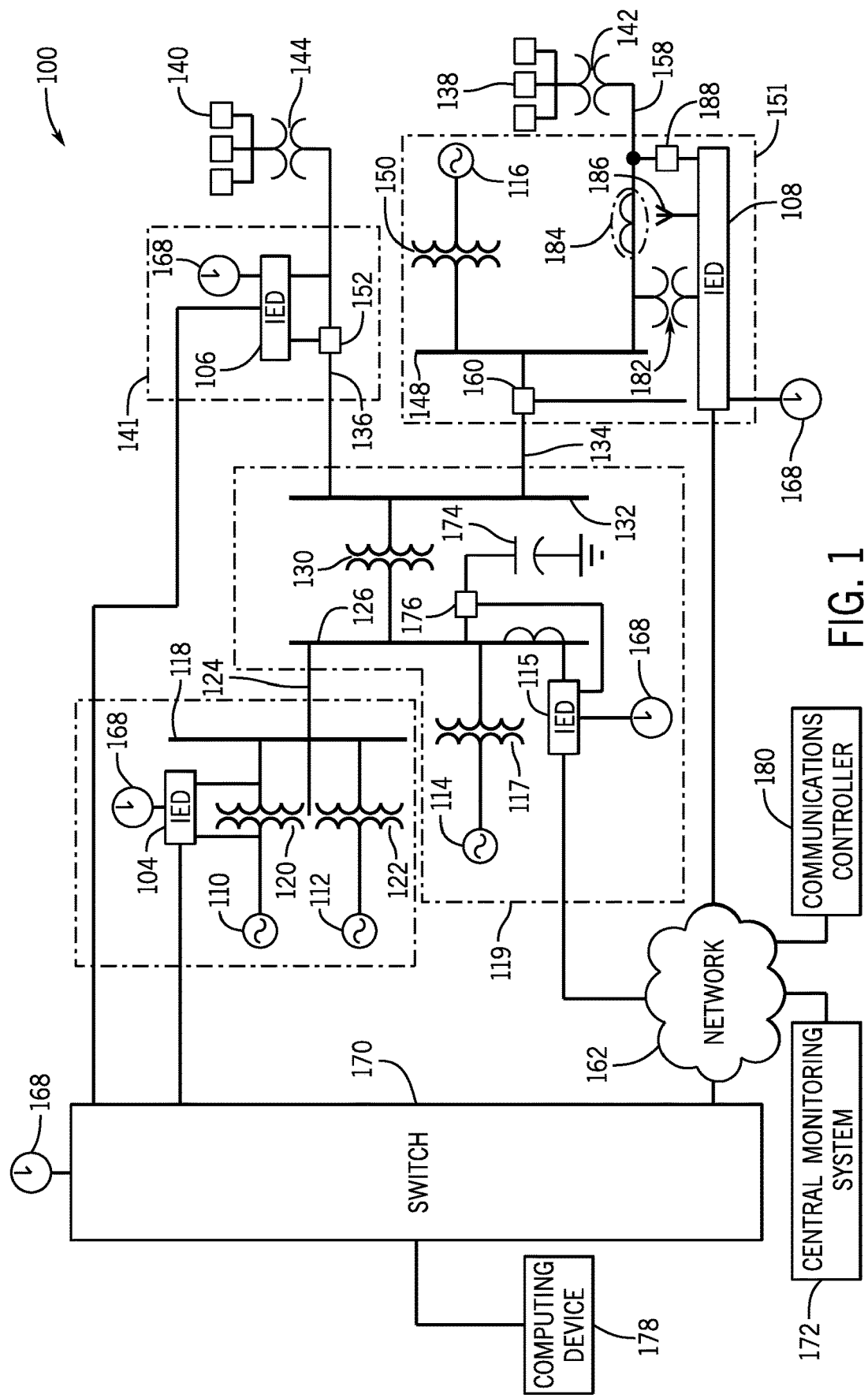
FIG. 1 is a schematic diagram of an embodiment of an electric power distribution system, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the procedures of a method do not necessarily need to be executed in any specific order, or even sequentially, nor need the procedures be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Embodiments of the present disclosure are directed to establishing a secure communication link or channel between devices of an electric power distribution system. Intelligent electronic devices (IEDs) may be used to control certain devices and to perform certain operations of the electric power distribution system. For example, an IED may be a relay that enables or blocks electrical power flow between other devices of the electric power distribution system. The IED may, for instance, communicate with a computing device, and the IED may operate based on the communication with the computing device (e.g., based on a user input). Furthermore, multiple IEDs may transmit data, such as operating information or sensor data, to one another to control various functions of devices of the electric power distribution system. As such, the IEDs may facilitate operation of the electric power distribution system.

Any of the IEDs may use a media access control security (MACsec) communication link and/or a MACsec key agreement (MKA) connectivity association to communicate data. To establish the MACsec communication link, an MKA protocol is used to enable communications between the switch and the IED During the MKA protocol, a device that acts as a key server, such as a switch, a controller, or another IED, may select a connectivity association key (CAK) or a new CAK from a set of keys (e.g., a generated set of keys, a received set of keys) and distribute the CAK or a copy of the CAK to the IED via an adoption link (e.g., a pre-stored MKA link) established between the device and the IED. The device may then select a security association key (SAK) from the set of the keys for distribution to the IED via the MKA connectivity association. The device may retain a copy of the same SAK, and the switch and the IED may use their respective copies of the SAK to establish a MACsec communication link for communicating with one another. For example, each of the IED and the device may encrypt data using their copy of the SAK and/or may decrypt encrypted data using their copy of the SAK in order to transmit data securely between one another via the MACsec communication link.

In some circumstances, it may be difficult to establish respective MKA connectivity associations and/or MACsec communication links for multiple devices. For example, each IED may undergo a process that includes setting up the IED and immediately initiating establishment of the MKA connectivity association and/or the MACsec communication link with the IED Such a process may be time consuming, difficult, or otherwise undesirable. Indeed, in order to enable the MKA connectivity associations and/or the MACsec communication links to be established (e.g., during installation of the IEDs), the setup of each of the IEDs may have to be performed simultaneously, sequentially, or otherwise within a time period of one another. For this reason, establishing the secure communication links with the IEDs may be inefficient.

Accordingly, embodiments of the present disclosure relate to operating an IED in a passive mode and an active mode to efficiently establish secure a communication link. For instance, the IED may be set up (e.g., device settings may be configured) to cause the IED to operate in the passive mode, in which the IED is prepared to establish a MKA connectivity association and/or a MACsec communication link but does not yet initiate the MKA protocol. At a later time after the passive mode of the IED has been initiated, the IED may receive activation data, such as a specific data packet, a sequence of data packets, an input data, and/or an MKA frame (e.g., MACsec key agreement protocol data units (MKAPDUs)). The activation data may cause the IED to transition from the passive mode to the active mode in which the IED initiates the MKA protocol to establish the MKA connectivity association and/or the MACsec communication link. After completion of the MKA protocol, the IED may communicate data via the MKA connectivity association and/or the MACsec communication link. In this manner, the IEDs do not have to initiate the MKA protocol immediately after setup. Such operation may facilitate initialization of the MKA protocol by multiple IEDs. For example, multiple IEDs may be placed in the passive modes at different times (e.g., prior to installation). At a separate time (e.g., during installation), each of or a subset of the IEDs may be transitioned to the active mode within a threshold period of time of one another (e.g., substantially simultaneously) by transmitting the activation data to the IEDs to establish secure communication links with the IEDs Therefore, different IEDs may be set up in the passive mode at different times, but each of the IEDs may establish the MKA connectivity associations and/or MACsec communication links at a desirable time (e.g., within the threshold period of time). As such, operation of the passive mode and the active mode may facilitate preparing and initiating establishment of secure communication links with the IEDs, such as by improving an efficiency associated with establishing the secure communication links.

With the preceding in mind, FIG. 1 is a schematic diagram of an electric power distribution system 100 that may generate, transmit, and/or distribute electric energy to various loads (e.g., different structures). The electric power distribution system 100 may use various IEDs 104, 106, 108, 115 to control certain aspects of the electric power distribution system 100. As used herein, an IED (e.g., the IEDs 104, 106, 108, 115) may refer to any processing-based device that monitors, controls, automates, and/or protects monitored equipment within the electric power distribution system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power distribution system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power distribution system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power distribution system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power distribution system 100 using a communications network 162 and/or using a common time source, such as a Global Navigation Satellite System ("GNSS"), or the like.

The IEDs 104, 106, 108, 115 may be used for controlling various other equipment of the electrical power distribution system 100. By way of example, the illustrated electric power distribution system 100 includes electric generators 110, 112, 114, 116 and power transformers 117, 120, 122, 130, 142, 144, 150. The electric power distribution system 100 may also include electric power lines 124, 134, 136, 158 and/or busses 118, 126, 132, 148 to transmit and/or deliver power, circuit breakers 152, 160, 176 to control flow of power in the electric power distribution system 100, and/or loads 138, 140 to receive the power in and/or from the electric power distribution system 100. A variety of other types of equipment may also be included in electric power distribution system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB)

188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the distribution bus 132 via the power transformer 130 (e.g., a step-down transformer). Various electric power lines 136, 134 may be connected to the distribution bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the distribution bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A switch or gateway 170 may be in communication with the IEDs 104, 106, 108, 115. The IEDs 104, 106, 108, 115 may be remote from the switch 170 and may communicate over various media. For instance, the switch 170 may be directly in communication with the IEDs 104, 106 and may be in communication with the IEDs 108, 115 via the communications network 162.

The switch 170 may enable and/or block data flow between any of the IEDs 104, 106, 108, 115. For example, during operation of the electric power distribution system 100, the IEDs 104, 106, 108, 115 may transmit data with one another by initially transmitting the data to the switch 170. The switch 170 may receive the data and may subsequently transmit the data to an intended recipient of the data. The switch 170 may also control data flow between one of the IEDs 104, 106, 108, 115 and another device communicatively coupled to the switch 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power distribution system 100 via the switch 170 and/or to send data, such as a user input, to the electric power distribution system 100 via the switch 170. Thus, the switch 170 may enable or block operation of the electric power distribution system 100 via the computing device 178.

A communications controller 180 may interface with equipment in the communications network 162 to create an SDN that facilitates communication between the switch 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the switch 170 to instruct the switch 170 to transmit certain data (e.g., data associated with a certain set of characteristics or information) to a particular destination (e.g., an intended recipient) using flows, matches, and actions defined by the communications controller 180.

In some embodiments, the switch 170 and the IEDs 104, 106, 108, 115 may communicate with one another via an MKA connectivity association and/or a MACsec communication link or channel. The MACsec communication link may be established via SAKs distributed to enable encryption and/or decryption of data. To this end, the switch 170 or another key device (e.g., a key server) may generate and distribute keys, such as CAKs and/or SAKs, to the IEDs 104, 106, 108, 115 to establish the MKA connectivity association and/or the MACsec communication link. For instance, the switch 170 may establish an MKA connectivity association with one of the IEDs 104, 106, 108, 115 via an MKA protocol that includes establishing an adoption link between the switch 170 and the IED, distributing a CAK to the IED via the adoption link, establishing an MKA connectivity association with the IED based on a verified possession of the CAK, distributing an SAK to the IED via the MKA connectivity association, and communicating data with the IED using the SAK. Indeed, the switch 170 and the IED may use copies of the same SAK to encrypt data to be transmitted as well as to decrypt encrypted data that has been received. Such encrypted data is transmitted via a MACsec communication link established between the devices to transmit the data securely. Although the present disclosure primarily discusses the use of MKA connectivity associations and MACsec communication links to communicate data, any other suitable communication techniques may be used to communicate data between devices of the electric power distribution system 100.

Any of the IEDs 104, 106, 108, 115 may operate in a passive mode to facilitate establishment of an MKA connectivity association and/or a MACsec communication link with another device (e.g., with the switch 170). In the passive mode, the IED may be set up or prepared to establish the MKA connectivity association and/or the MACsec communication link upon receiving certain activation data. During operation in the passive mode, the IED may continue to transmit data via a previously established communication link that is not an MKA connectivity association or a MACsec communication link. In response to receipt of the activation data in the passive mode, the IED may initiate procedures (e.g., the MKA protocol) to establish the MKA connectivity association and/or the MACsec communication link and replace the previously established communication link. In this manner, the IED may operate in the passive mode indefinitely and may continue to communicate until it is desirable for the MKA connectivity association and/or the MACsec communication link to be established. In some circumstances, during performance of the procedures to establish the MKA connectivity association and/or the MACsec communication link, a fault may occur to block completion of the procedure. In response, the IED may revert back to communicating via the previously established communication link. Thus, the IED may continue to communicate data after occurrence of the fault.

Figure 2:
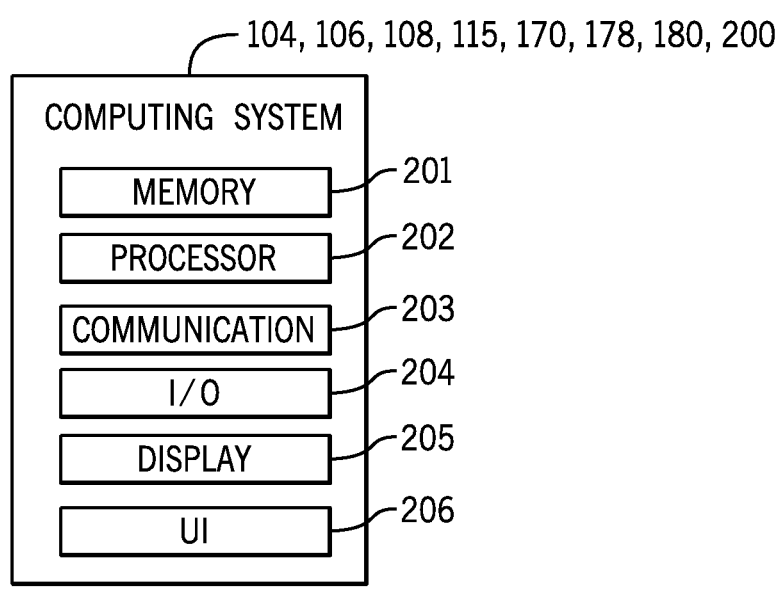
FIG. 2 is a schematic diagram of an embodiment of a computing system that may be incorporated in a device of an electric power distribution system, in accordance with an aspect of the present disclosure.

FIG. 2 is a schematic diagram of an embodiment of a computing system 200 that may be incorporated within a device of the electric power distribution system 100, such as in any of the IEDs 104, 106, 108, 115, the switch 170, and/or the computing device 178. The computing system 200 may include a memory 201 and a processor or processing circuitry 202. The memory 201 may include a non-transitory computer-readable medium that may store instructions that, when executed by the processor 202, may cause the processor 202 to perform various methods described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may, in some embodiments, include multiple processors.

The computing system 200 may also include a communication system 203, which may include a wireless and/or wired communication component to establish a communication link with another device of the electric power distribution system 100. That is, the communication system 203 enables the computing system 200 (e.g., of one of the IEDs 104, 106, 108, 115) to communication with another communication system 203 of another computing system 200 (e.g., of the switch 170), such as via a MACsec communication link. Indeed, the communication system 203 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other industrial communication network protocol.

Additionally, the computing system 200 may include input/output (I/O) ports 204 that may be used for communicatively coupling the computing system 200 to an external device. For example, the I/O ports 204 of the computing system 200 of the switch 170 may communicatively couple to corresponding I/O ports 204 of the computing system 200 of the computing device 178. The computing system 200 may further include a display 205 that may present any suitable image data or visualization. Indeed, the display 205 may present image data that includes various information regarding the electric power distribution system 100, thereby enabling the user to observe an operation, a status, a parameter, other suitable information, or any combination thereof, of the electric power distribution system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 of the computing system 200 of the computing device 178 to transmit data to the switch 170.

Figure 3:
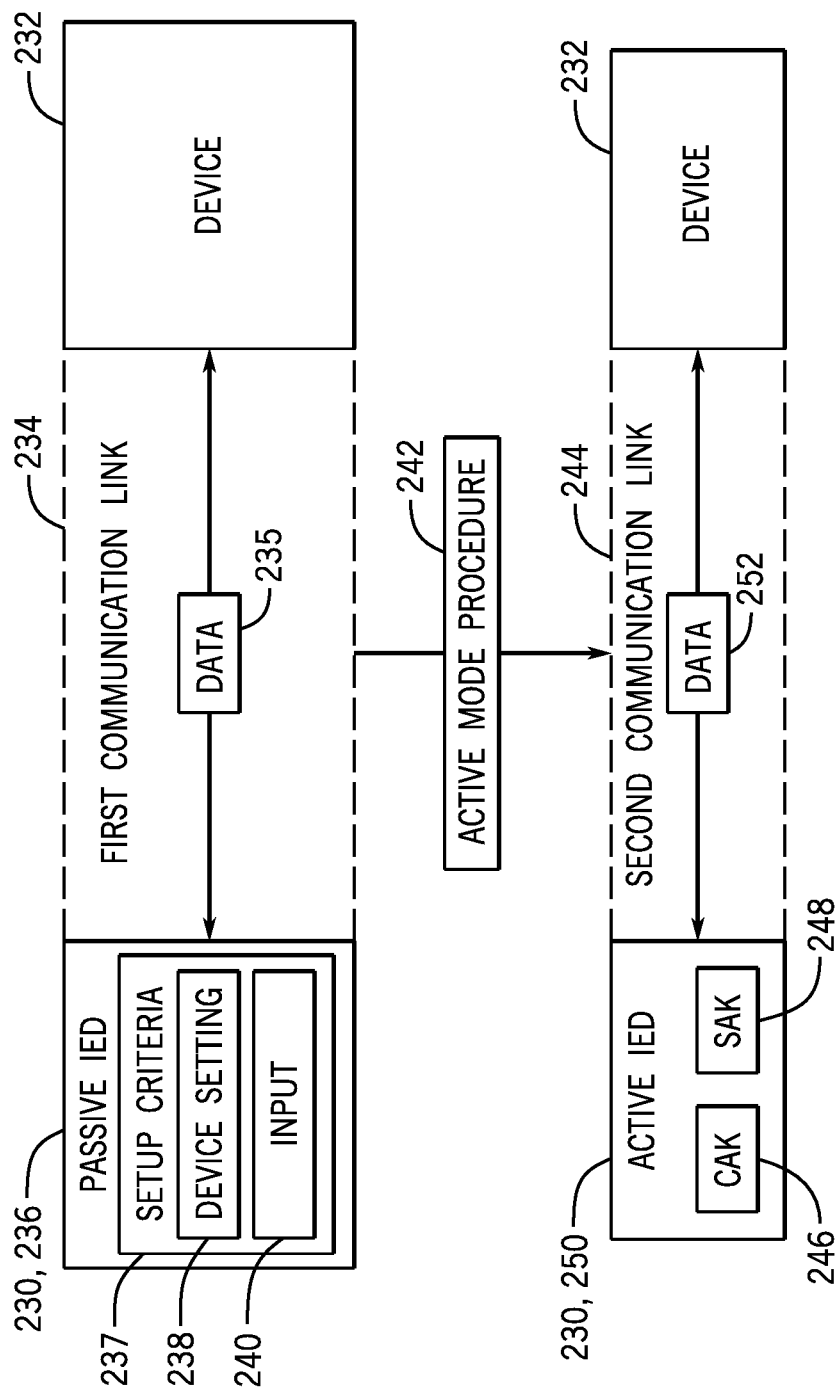
FIG. 3 is a schematic diagram of an embodiment of an intelligence electronic device (IED) transitioning from a passive mode to an active mode, in accordance with an aspect of the present disclosure.

FIG. 3 is a schematic diagram of an embodiment of an IED 230 (e.g., any of the IEDs 104, 106, 108, 115) transitioning from a passive mode to an active mode to establish an MKA connectivity association and/or a MACsec communication link between the IED 230 and another device 232 (e.g., another of the IEDs 104, 106, 108, 115, the switch 170, the communications controller 180). Prior to there being an established MKA connectivity association and/or MACsec communication link between the IED 230 and the device 232, the IED 230 and the device 232 may communicate via a first communication link 234. For example, the first communication link 234 may include an initial connection, such as a cable and/or a wireless link, communicatively coupling the IED 230 and the device 232 to one another, and the IED 230 and the device 232 may communicate data 235 via the first communication link 234 (e.g., using plain-text format). That is, the IED 230 may transmit data 235 to and/or receive data 235 from the device 232, and/or the device 232 may transmit data 235 to and/or receive data 235 from the IED 230.

The IED 230 may be placed in a passive mode, thereby becoming a passive IED 236, in order to prepare the IED 230 to initiate the MKA protocol when triggered. The passive mode of the IED 230 may be based on setup criteria 237, such as configuration of one or more device settings 238 of the IED 230 and/or receipt of one or more inputs 240. The device setting(s) 238 and/or the input(s) 240 may enable certain functionalities of the IED 230 to perform the MKA protocol and/or to establish a certain configuration of the MKA connectivity association and/or of the MACsec communication link. As an example, the device setting(s) 238 may include a data transmission setting, and the input(s) 240 may include a passcode.

In some embodiments, the setup criteria 237 may be manually established, such as prior to installation of the IED 230 in the electric power distribution system 100. For instance, a first user or group of users (e.g., a technician) may set the device setting(s) 238 and/or transmit the input(s) 240 to place the IED 230 in the passive mode. The IED 230 may then remain in the passive mode for a predetermined period of time. Additionally, during the passive mode, the IED 230 may continue to communicate data 235 via the first communication link 234. That is, operation of the IED 230 in the passive mode may not affect usage of the first communication link 234.

The IED 230 may perform an active mode procedure 242 to establish a second communication link 244 (e.g., a secured version of the first communication link 234) between the IED 230 and the device 232. The active mode procedure 242 may include receiving activation data (e.g., via the first communication link 234) to cause the IED 230 to operate in the active mode and initiate the MKA protocol. The activation data may include a particular data packet and/or a sequence of data packets, such as an MKA frame that contains certain information. In certain embodiments, the activation data may be transmitted via a user input. By way of example, a second user or group of users (e.g., an operator) may transmit a user input (e.g., via the device 232) that causes the activation data to be transmitted to the IED 230. For instance, the activation data may be transmitted to the IED 230 upon confirmation that the IED 230 is properly installed in the electric power distribution system 100, such as based on confirmation that the IED 230 is able to communicate with the device 232 via the first communication link 234. As a result, the IED 230 may become an active IED 250 to initiate the MKA protocol of the active mode procedure 242.

As a result of the MKA protocol, the IED 230 may receive a copy of a CAK 246 and a SAK 248 (e.g., from the device 232) for communicating data 252 via the second communication link 244 instead of via the first communication link 234. The second communication link 244 may include an MKA connectivity association established via the CAK 246 and/or a MACsec communication link established via the SAK 248. By way of example, the MKA connectivity association may be established based on a verification that the IED 230 possesses the CAK 246, and the SAK 248 may be distributed to the IED 230 via the MKA connectivity association. The IED 230 may use the SAK 248 to encrypt data 252 to be transmitted to the device 232 and/or to decrypt encrypted data 252 received from the device 232. The device 232 may use another copy of the same SAK 248 to encrypt the data 252 to be transmitted to the IED 230 and/or to decrypt encrypted data 252 received from the IED 230. In this way, the IED 230 may communicate via the second communication link 244 after performance of the active mode procedure 242. In certain embodiments, the active mode procedure 242 may be performed based on the setup criteria 237, such as to establish a particular configuration of the second communication link 244 (e.g., a MACsec communication link having a particular parameter or characteristic).

In some circumstances, the active mode procedure 242 may not be successfully completed. By way of example, the setup criteria 237 may not match with an expected setup criteria 237 to enable establishment of the second communication link 244. That is, the MKA connectivity association and/or the MACsec communication link may not be established between the IED 230 and the device 232. In response, the IED 230 may continue to communicate with the device 232 via the first communication link 234 instead of via the second communication link 244. As such, the IED 230 may continue to communicate with the device 232, thereby enabling the electric power distribution system 100 to continue to operate, even though the second communication link 244 is not successfully established between the IED 230 and the device 232. For instance, the IED 230 may continue to communicate with the device 232 via the first communication link 234 while a user performs an action, such as a maintenance operation, to enable successful performance of the active mode procedure 242 to establish the second communication link 244.

Further, the passive mode may be suspended. In an example, the passive mode may be suspended in response to a period of time associated with operation in the passive mode exceeding a threshold period of time. That is, the IED 230 may no longer operate in the passive mode in response to the activation data not being received within the threshold period of time. Thus, the passive mode may be automatically suspended. In another example, the passive mode may be suspended manually. For instance, the IED 230 may no longer operate in the passive mode based on receipt of a user input, such as a user input that includes a request to suspend operation in the passive mode. While the passive mode is suspended, the IED 230 may no longer be able to initiate the MKA protocol upon receipt of the activation data. In other words, in response to receipt of the activation data while the passive mode is suspended, the IED 230 may not perform the active mode procedure 242. However, the IED 230 may be set up and re-configured to operate in the passive mode again, such as by establishing the setup criteria 237, to prepare the IED 230 to transition to the active mode in response to receipt of the activation data.

Figure 4:
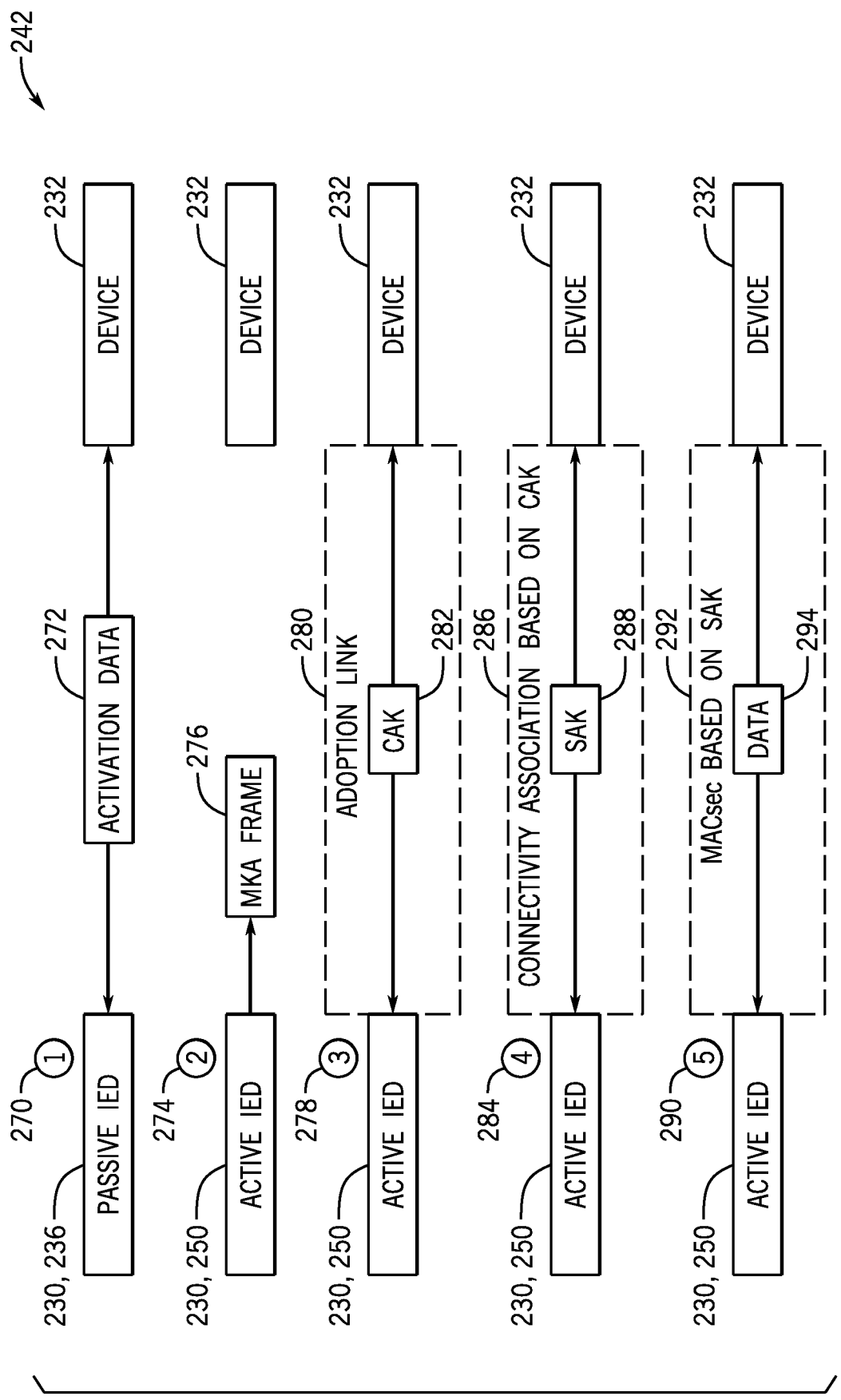
FIG. 4 is a schematic diagram of an embodiment of a procedure for transitioning an IED from a passive mode to an active mode, in accordance with an aspect of the present disclosure.

FIG. 4 is a schematic diagram of an embodiment of the active mode procedure 242. Thus, the procedures illustrated in FIG. 4 may be performed after the IED 230 has been set up to operate in the passive mode (e.g., to operate as the passive IED 236), such as via establishment of the setup criteria 237. In the illustrated embodiment, the IED 230 communicatively couples to the device 232 after performing the active mode procedure 242. For instance, the IED 230 may initially be communicatively coupled to the device 232 via a cable or other connection prior to performance of the active mode procedure 242. In additional or alternative embodiments, the device 232 may include a separate device, such as the communications controller 180, that does not directly communicatively couple with the IED 230. In such embodiments, the device 232 may cause the IED 230 to initiate the MKA protocol to directly communicatively couple to a different device (e.g., another IED, the switch 170).

At a first block 270, the IED 230 may receive activation data 272 from the device 232. The activation data 272 may include specific information, such as an MKA frame, to cause the IED 230 to transition to the active mode. In certain embodiments, the device 232 may transmit the activation data 272 in response to a user input, such as an interaction with a feature (e.g., a touch screen, a button, a switch) of the device 232. In additional or alternative embodiments, the device 232 may transmit the activation data 272 automatically, such as based on a detected parameter (e.g., a set time).

At a second block 274, in response to receipt of the activation data 272, the IED 230 may operate in the active mode (e.g., to operate as the active IED 250) and initiate the MKA protocol based on the setup from the passive mode. For instance, the IED 230 may indicate to the device 232 that the IED 230 is to establish an MKA connectivity association and/or a MACsec communication link with the device 232. Such an indication may include generating an MKA frame (e.g., MKPDU) using a CAK that was generated based on the setup of the IED 230 (e.g., the setup criteria 237) to operate in the passive mode and/or using an integrity check key (ICK) derived from the CAK, and then broadcasting the MKA frame 276. In response, the device 232 may identify the MKA frame 276 broadcasted by the IED upon initiating the MKA protocol and determine whether the MKA frame 276 was generated using an expected CAK or ICK to indicate that the device 232 is to communicatively couple to the IED 230 upon performance of the MKA protocol. By way of example, the MKA frame 276 may be integrity protected by an integrity check value (e.g., a 128 bit integrity check value) generated using the ICK derived from the CAK, and the device 232 may validate the integrity check value to verify whether the ICK and therefore the MKA frame 276 was generated using an expected CAK. The device 232 may confirm that the device 232 is to communicatively couple to the IED 230 based on a determination that the MKA frame 276 was generated using an expected CAK or ICK, such as based on the integrity check value matching with an expected integrity check value.

As a result of a determination that the device 232 is to communicatively couple to the IED 230, at a third block 278, an adoption link 280 may be established between the IED 230 and the device 232. Thereafter, the device 232 may transmit a copy of a CAK 282 to the IED 230 via the adoption link 280. By way of example, the device 232 may generate or receive the CAK 282, which may include a structure that causes an MKA connectivity association of a particular configuration (e.g., having a particular characteristic or parameter) to be established.

At a fourth block 284, based on a verification that the IED 230 possesses the CAK 282, an MKA connectivity association 286 may be established between the IED 230 and the device 232 based on the CAK 282. The device 232 may then generate or receive a SAK 288 and distribute a copy of the SAK 288 to the IED 230 via the MKA connectivity association 286. As an example, the SAK 288 may be generated based on the CAK 282 and may include a structure that causes a MACsec communication link of a particular configuration (e.g., having a particular characteristic or parameter) to be established.

At a fifth block 290, a MACsec communication link 292 may be established between the IED 230 and the device 232 based on the SAK 288 to complete establishment of the secure communication link (e.g., the second communication link 244) between the IED 230 and the device 232. The IED 230 and the device 232 may then communicate data 294 with one another via the MACsec communication link 292. For instance, the IED 230 may use the SAK 288 to encrypt data 294 to be transmitted to the device 232 via the MACsec communication link 292 and/or to decrypt encrypted data 294 received from the device 232 via the MACsec communication link 292. Additionally, the device 232 may use the SAK 288 to encrypt data 294 to be transmitted to the IED 230 via the MACsec communication link 292 and/or to decrypt encrypted data 294 received from the IED 230 via the MACsec communication link 292.

Figure 5:
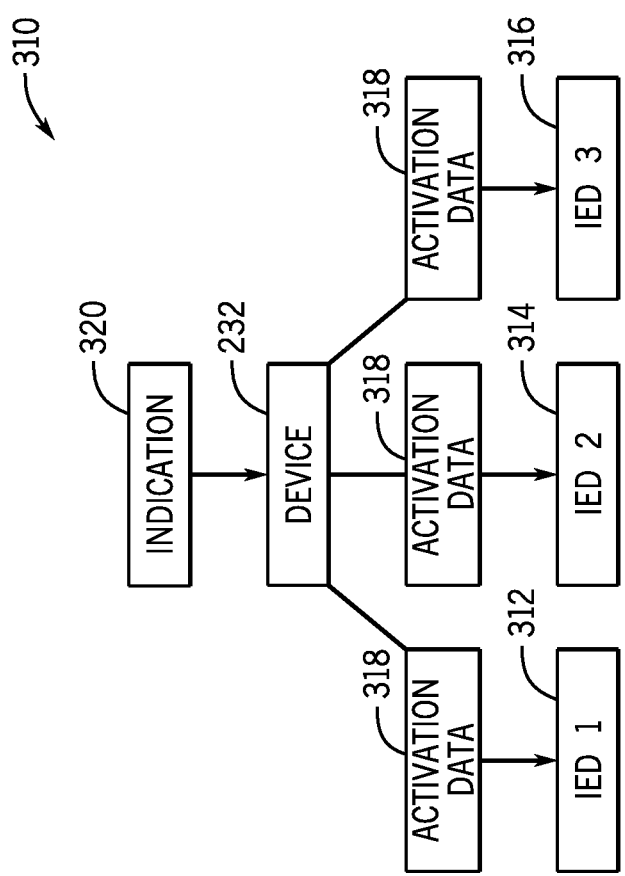
FIG. 5 is a schematic diagram of an embodiment of a communication network in which a device outputs activation inputs to transition multiple IEDs to an active mode, in accordance with an aspect of the present disclosure.

FIG. 5 is a schematic diagram of an embodiment of a communication network 310 of the electric power distribution system 100 in which the device 232 may communicatively couple with a first IED 312, a second IED 314, and/or a third IED 316. Each of the IEDs 312, 314, 316 may be separately set up to operate in the passive mode. In other words, the IEDs 312, 314, 316 may be set up at different times and/or at different locations to operate in the passive mode. For example, a first user may establish the setup criteria 237 of the first IED 312 at a first time and/or a first location, a second user may establish the setup criteria 237 of the second IED 314 at a second time and/or a second location, and/or a third user may set up the setup criteria 237 of the third IED 316 at a third time and/or a third location. The IEDs 312, 314, 316 may then remain in the passive mode after setup until receipt of activation data that causes the IEDs 312, 314, 316 to transition to the active mode.

In the illustrated embodiment, the device 232 may transmit activation data 318 to each of the IEDs 312, 314, 316 to transition the IEDs 312, 314, 316 to the active mode. For instance, the device 232 may initially be communicatively coupled to each of the IEDs 312, 314, 316 (e.g., via a cable), and the device 232 may receive an indication 320, such as a user input (e.g., an interaction with the device 232) and/or a determined parameter (e.g., an operating parameter of the electric power distribution system 100), that causes the device 232 to transmit the activation data 318 to each of the IEDs 312, 314, 316. Upon receipt of the activation data 318, the respective IEDs 312, 314, 316 may transition to the active mode to establish a secure communication link (e.g., an MKA connectivity association, a MACsec communication link) with the device 232. As an example, the device 232 may transmit individual activation data 318 to the IEDs 312, 314, 316 within a threshold period of time of one another (e.g., substantially simultaneously), thereby enabling each of the IEDs 312, 314, 316 to transition to the active mode within the threshold period of time of one another. In this manner, the IEDs 312, 314, 316 do not have to be set up (e.g., during installation) to initiate the MKA protocol immediately after setup in order to establish the secure communication links with the device 232. Rather, each of the IEDs 312, 314, 316 may be set up to operate in the passive mode at any suitable times (e.g., prior to installation). At a separate time (e.g., during installation), each of the IEDs 312, 314, 316 may transition from the passive mode to the active mode to establish respective secure communication links with the device 232 within the threshold period of time. Thus, separating the operation in the passive mode and the active mode may improve an ease and/or increase an efficiency associated with establishing secure communication links between the device 232 and multiple IEDs 312, 314, 316.

Figure 6:
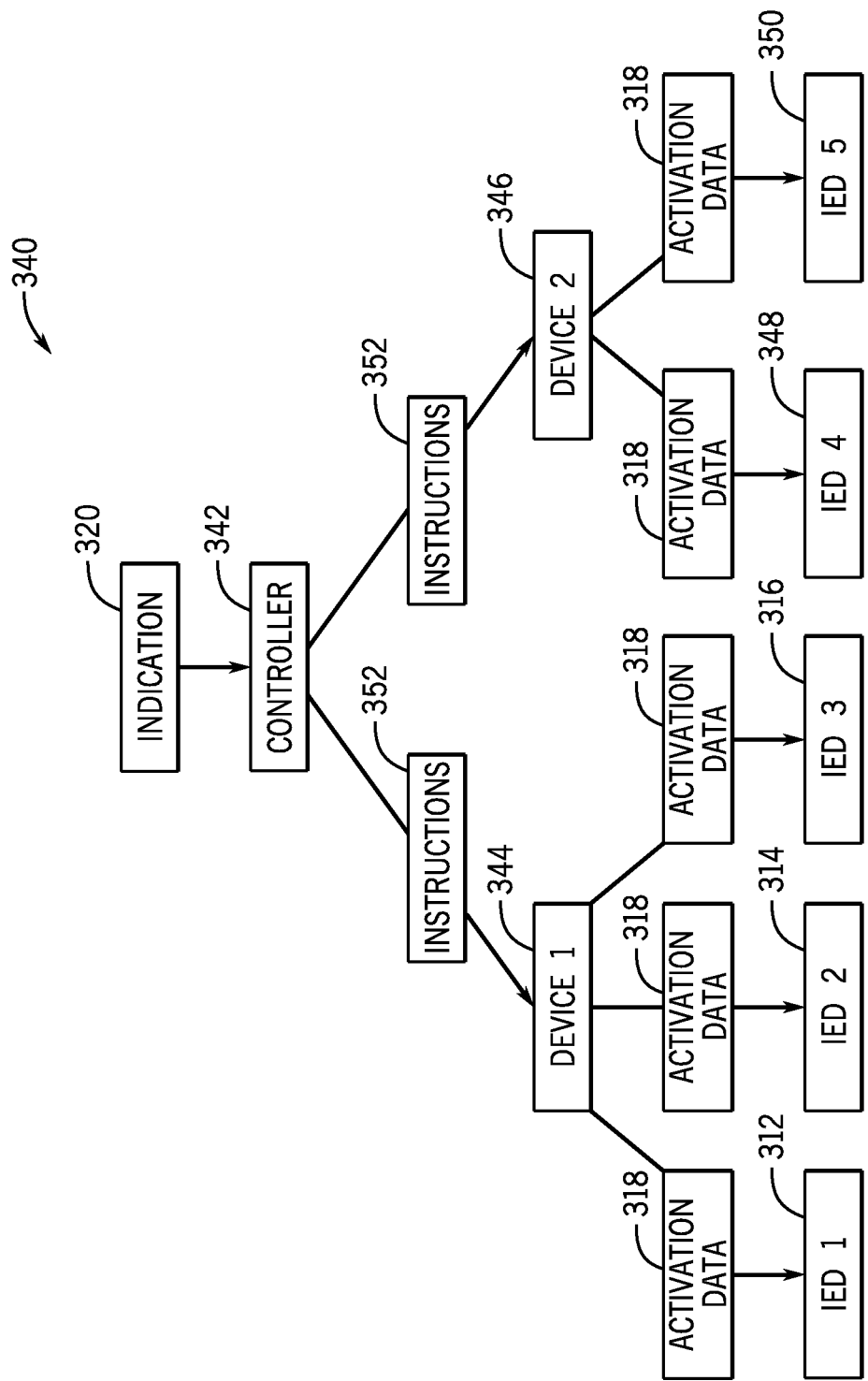
FIG. 6 is a schematic diagram of an embodiment of a communication network in which a controller instructs multiple switches to output activation inputs to transition multiple IEDs to an active mode, in accordance with an aspect of the present disclosure.

FIG. 6 is a schematic diagram of an embodiment of a communication network 340 in which a controller 342 (e.g., the communications controller 180) is communicatively coupled to a first device 344 and a second device 346. The first device 344 may be communicatively coupled to the first IED 312, the second IED 314, and the third IED 316. The second device 346 may be communicatively coupled to a fourth IED 348 and a fifth IED 350. That is, the first device 344 and the second device 346 may be communicatively coupled to different IEDs 312, 314, 316, 348, 350.

Each of the IEDs 312, 314, 316, 348, 350 may operate in the passive mode (e.g., be set up in the passive mode at different times). Further, each of the IEDs 312, 314, 316, 348, 350 may transition from the passive mode to the active mode upon receipt of the activation data 318 transmitted by the respective devices 344, 346. In some embodiments, the controller 342 may transmit instructions 352 to the devices 344, 346 to cause the devices 344, 346 to transmit the activation data 318 to the IEDs 312, 314, 316, 348, 350. For example, the controller 342 may receive the indication 320 (e.g., a user input, a detected parameter) and may transmit the instructions 352 to each of the devices 344, 346 within a first threshold period of time based on the indication 320. Upon receipt of the instructions 352, each of the devices 344, 346 may then transmit the activation data 318 to each of the IEDs 312, 314, 316, 348, 350 within a second threshold period of time. In this way, even though the IEDs 312, 314, 316, 348, 350 may be communicatively coupled to different devices 344, 346, a single indication 320 received by the controller 342, instead of respective indications received by the devices 344, 346, may cause the devices 344, 346 to transmit the activation data 318 to establish the secure communication links with the IED 312, 314, 316, 348, 350 within the second threshold period of time of one another. Such operation of the controller 342 may further improve an ease and/or increase an efficiency associated with establishing secure communication links between the device 344, 346 and multiple IEDs 312, 314, 316, 348, 350.

In additional or alternative embodiments, the controller 342 may transmit the instructions 352 at substantially different times of one another. For instance, the indication 320 may request that the controller 342 transmit the instructions 352 to one of the devices 344, 346 and not the other of the devices 344, 346. Thus, the activation data 318 may be transmitted to a subset of the IEDs 312, 314, 316, 348, 350 (e.g., the IEDs 312, 314 that are communicatively coupled to the first device 344) and not a remainder of the IEDs 312, 314, 316, 348, 350 (e.g., the IEDs 348, 350 that are communicatively coupled to the second device 346). In response, secure communication links may not be established with the remainder of the IEDs 312, 314, 316, 348, 350, and such IEDs 312, 314, 316, 348, 350 may remain in the passive mode.

Figure 7:
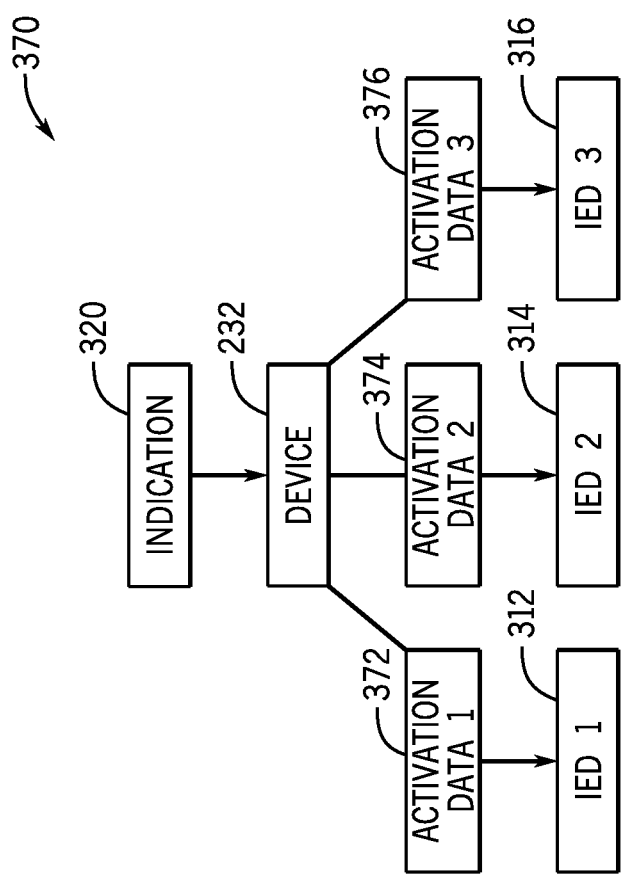
FIG. 7 is a schematic diagram of an embodiment of a communication network in which a device outputs different activation inputs to selectively transition IEDs to an active mode, in accordance with an aspect of the present disclosure.

FIG. 7 is a schematic diagram of an embodiment of a communication network 370 in which the device 232 is communicatively coupled to the IEDs 312, 314, 316. Each of the IEDs 312, 314, 316 may operate in the passive mode. However, in the illustrated embodiment, each of the IEDs 312, 314, 316 may transition from the passive mode to the active mode based on receipt of different activation data. As an example, the first IED 312 may transition from the passive mode to the active mode in response to receipt of first activation data 372 (e.g., a first MKA frame having a first set of information; a first MKA frame along with a first passcode), the second IED 314 may transition from the passive mode to the active mode in response to receipt of second activation data 374 (e.g., a second MKA frame having a second set of information; a second MKA frame along with a second passcode), and the third IED 316 may transition from the passive mode to the active mode in response to receipt of third activation data 376 (e.g., a third MKA frame having a third set of information; a third MKA frame along with a third passcode). However, the respective IEDs 312, 314, 316 may not transition from the passive mode to the active mode in response to receipt of other activation data. That is, the first IED 312 may not transition from the passive mode to the active mode in response to receipt of the second active data 374 and/or the third activation data 376, the second IED 314 may not transition from the passive mode to the active mode in response to receipt of the first activation data 372 and/or the third activation data 376, and the third IED 316 may not transition from the passive mode to the active mode in response to receipt of the first activation data 372 and/or the second activation data 374.

In certain embodiments, the device 232 may transmit the different activation data 372, 374, 376 based on the same indication 320. That is, in response to receipt of a single indication 320, the device 232 may transmit the activation data 372, 374, 376 within a threshold period of time to the corresponding IEDs 312, 314, 316 to transition each of the IEDs 312, 314, 316 to the active mode. In additional or alternative embodiments, the device 232 may transmit the different activation data 372, 374, 376 at different times. By way of example, the indication 320 may specifically indicate that the device 232 is to transmit a subset of the activation data 372, 374, 376 to the corresponding IEDs 312, 314, 316. In response, a subset of the IEDs 312, 314, 316 may transition to the active mode based on the indication 320. That is, respective MKA connectivity associations and/or MACsec communication links may be established between the device 232 and a subset of the IEDs 312, 314, 316 based on the indication 320. A secure communication link may not be established with a remainder of the IEDs 312, 314, 316 that did not receive the corresponding activation data 372, 374, 376, and the remainder of the IEDs 312, 314, 316 may remain in the passive mode.

The embodiment illustrated in FIG. 7 may also be incorporated in a communication network similar to the communication network 340 described with respect to FIG. 6. That is, the instructions 352 transmitted by the controller 342 (e.g., based on the indication 320) may indicate that the devices 344, 346 are to transmit activation data 372, 374, 376 to a corresponding subset of the IEDs 312, 314, 316, 348, 350 and not to a remainder of the IEDs 312, 314, 316, 348, 350. Thus, secure communication links may be established with the subset of the IEDs 312, 314, 316, 348, 350 and not the remainder of the IEDs 312, 314, 316, 348, 350 based on a single indication 320 transmitted to the controller 342, (e.g., instead of individual indications transmitted to the devices 344, 346).

Each of FIGS. 8-10 described below illustrates a method associated with operation based on a passive mode and/or an active mode of an IED In some embodiments, each of the methods may be performed by a single respective component or system, such as by the computing system 200 (e.g., the processor 202). In additional or alternative embodiments, multiple components or systems may perform the procedures for a single one of the methods. It should also be noted that additional procedures may be performed with respect to the described methods. Moreover, certain procedures of the depicted methods may be removed, modified, and/or performed in a different order. Further still, the procedures of any of the respective methods may be performed in parallel with one another, such at the same time and/or in response to one another.

Figure 8:
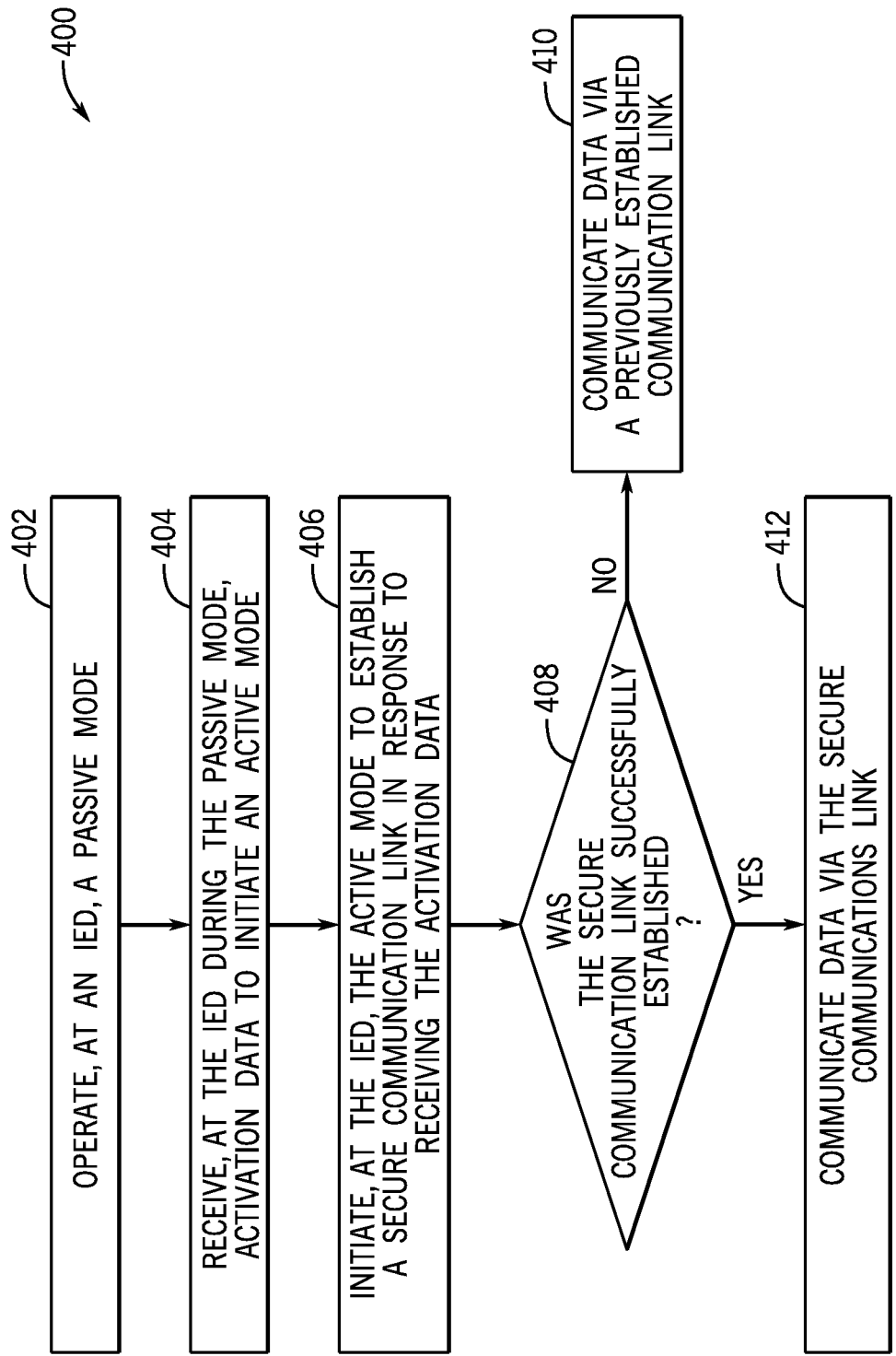
FIG. 8 is a flowchart of an embodiment of a method in which an IED transitions from a passive mode to an active mode to communicate with another device, in accordance with an aspect of the present disclosure.

FIG. 8 is a flowchart of an embodiment of a method 400 for communicating data based on a passive mode and/or an active mode. The method 400 is described from the perspective of an IED (e.g., any of the IEDs 104, 106, 108, 115, 230, 312, 314, 316, 348, 350). However, a method similar to the method 400 may be performed by any other device of the electric power distribution system 100. At block 402, the IED may operate in the passive mode, such as in response to determination of establishment of the setup criteria 237. For example, the device setting(s) of the IED may be configured and/or the IED may receive one or more inputs (e.g., a passcode). During operation in the passive mode, the IED may continue to communicate data with another device, such as via a previously established communication link established between the IED and the other device.

At block 404, while operating in the passive mode, the IED may receive activation data to initiate the active mode to establish a secure communication link. For instance, the IED may receive the activation data from the device with which the secure communication link is to be established and/or from a separate device. The activation data may include one or more data packets, one or more MKA frames, a passcode, an identifier (e.g., of the device transmitting the activation data), a key (e.g., a predetermined string), other suitable data or information, or any combination thereof. At block 406, in response to receipt of the activation data, the IED may initiate the active mode. By way of example, in response to receipt of the activation data, the IED may initiate the MKA protocol to establish a secure communication link with the other device.

At block 408, the IED may determine whether the secure communication link was successfully established, such as via the MKA protocol. At block 410, in response to a determination that the secure communication link was not successfully established, the IED may continue to communicate via the previously established communication link. As an example, during the MKA protocol, the IED may broadcast an MKA frame based on the setup of the IED for the passive mode. However, the MKA frame may be determined to have been generated by an unexpected key (e.g., based on a mismatch between the integrity check value of the MKA frame and an expected integrity check value), and the secure communication link may not be established as a result. As another example, the IED and/or the other device may have a fault that blocks establishment of the secure communication link. However, the IED may continue to communicate data even though the secure communication link was not successfully established. In some embodiments, in response to a determination that the secure communication link was not successfully established, the IED may transition from the active mode back to the passive mode. Thus, the IED may readily transition to the active mode again upon further receipt of the activation data. In additional or alternative embodiments, in response to a determination that the secure communication link was not successfully established, the IED may transition out of both the passive mode and the active mode. In this way, setup of the IED to operate in the passive mode may be performed again in order to enable the IED to initiate the active mode in response to receipt of the activation data. In further embodiments, the IED may output a notification indicative that the secure communication link was not successfully established. The notification may inform a user (e.g., a technician) that further action, such as a maintenance operation, is to be performed to enable establishment of the secure communication link.

At block 412, in response to a determination that the secure communication link was successfully established, the IED may communicate data via the secure communication link. For instance, as a result of performing the MKA protocol, the IED may receive a CAK and/or a SAK. An MKA connectivity association link may be established based on a verification that the IED possesses the CAK, and a MACsec communication link may be established using the SAK. The IED may use the SAK to encrypt data to be transmitted via the secure communication link. Additionally or alternatively, the IED may use the SAK to decrypt encrypted data received via the secure communication link.

In some embodiments, the IED may operate in the passive mode for a limited period of time. After the period of time has elapsed, the IED may then transition out of or exit the passive mode, and setup of the IED may be performed again to operate the IED in the passive mode. In other words, the IED may monitor a duration of time upon operating in the passive mode. If the duration of time exceeds a threshold period of time and no activation data has been received by the IED within the duration of time, operation of the passive mode may be suspended. By way of example, the threshold period of time may include days, weeks, or months, and may be designated via a user input. In additional or alternative embodiments, the IED may transition out of the passive mode in response to a user input.

In further embodiments, after the secure communication link has already been established, the IED may be able to transition back to operation in the passive mode. For instance, it may be desirable to replace the established secure communication link with a new or updated secure communication link (e.g., a secure communication link established with a different device, a secure communication link established using a different set of keys). Thus, the IED may operate in the passive mode to remove the established secure communication link and to enable the IED to transition to the active mode for establishment of the new secure communication link in response to receipt of additional activation data.

Figure 9:
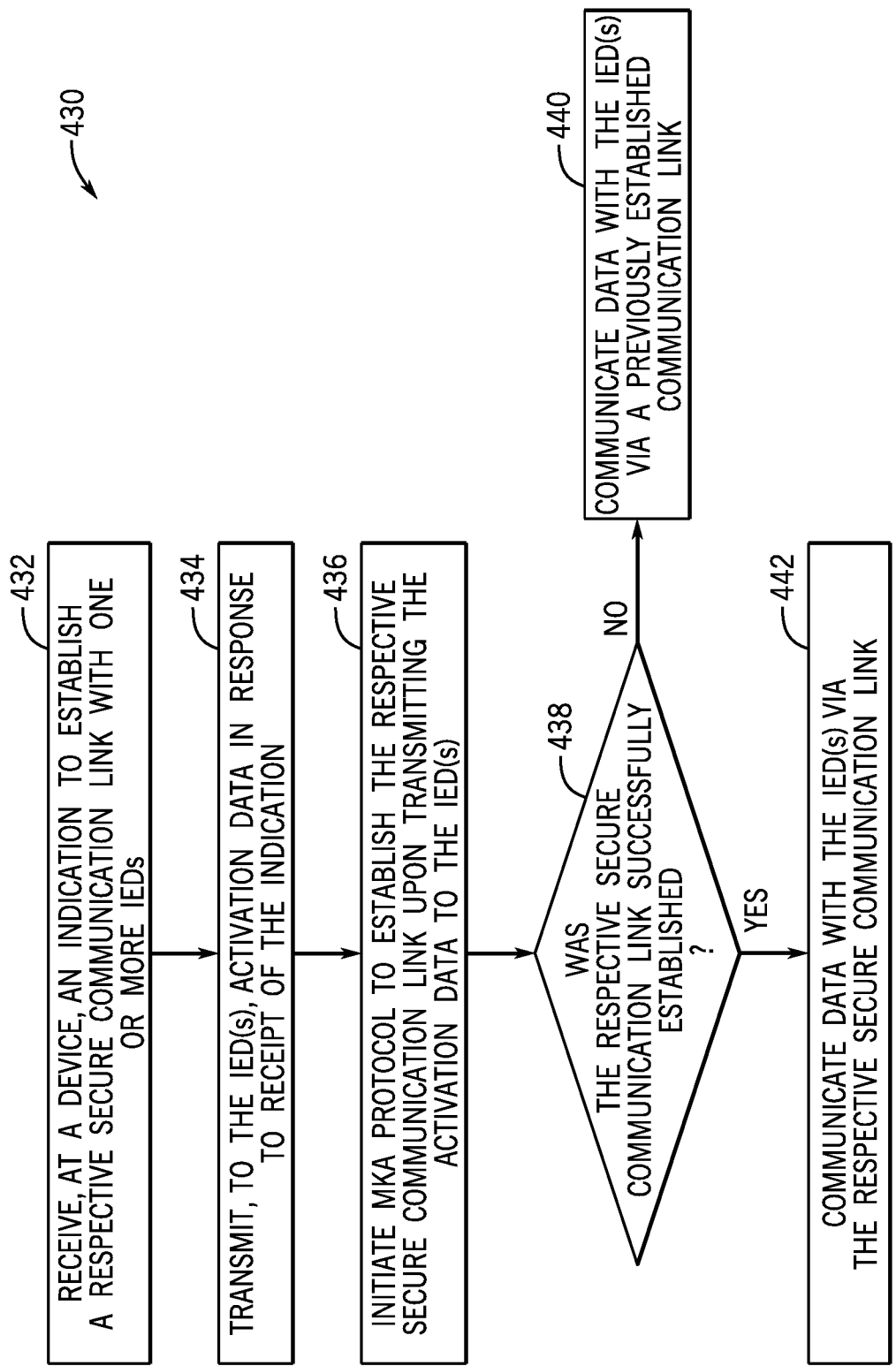
FIG. 9 is a flowchart of an embodiment of a method in which a device communicates with an IED that transitions from an passive mode to an active mode, in accordance with an aspect of the present disclosure.

FIG. 9 is a flowchart of an embodiment of a method 430 for communicating data based on a passive mode and/or an active mode of one or more IEDs. The method 400 is described from the perspective of a device (e.g., another IED, the switch 170) to be communicatively coupled to the IED(s). However, a method similar to the method 400 may be performed by any other device of the electric power distribution system 100. The method 400 may be performed after the device is already communicatively coupled to the IED(s) via a corresponding previously established communication link, such as via a cable.

At block 432, the device may receive an indication to establish a respective secure communication link with the IED(s). For example, the indication may include a user input (e.g., caused by an interaction with a component of the device), a parameter detected by the device, an instruction received by the device (e.g., from the communications controller 180), another suitable indication, or any combination thereof. At block 434, in response to receipt of the indication, the device may transmit activation data to the IED(s). In some embodiments, the device may transmit the activation data to all of the IED(s) within a threshold period of time to cause all of the IED(s) to initiate the active mode within the threshold period of time. In additional or alternative embodiments, the device may transmit activation data to a subset of the IED(s) to cause the subset of the IED(s) to initiate the active mode. In such embodiments, a remainder of the IED(s) may not receive the activation data and may not initiate the active mode.

At block 436, the device may initiate the MKA protocol upon transmitting the activation data to the IED(s). That is, the activation data may cause the IED(s) to initiate the active mode, and the device may initiate the MKA protocol to establish the secure communication link with the active IED(s). At block 438, the device may determine whether any of the respective secure communication links were successfully established. At block 440, in response to a determination that any of the respective secure communication links were not successfully established, the device may continue to communicate data with the corresponding IED(s) via the previously established communication link(s). For example, transmission of the activation data to the IED(s) may cause the IED(s) to broadcast an MKA frame. During the MKA protocol, the device may determine whether the MKA frame was generated by an expected key (e.g., the integrity check value of the MKA frame matches with an expected integrity check value). The device may block establishment of the respective secure communication link based on a determination that the MKA frame was not generated by an expected key. Additionally or alternatively, the device may determine that a fault has occurred to block establishment of any of the respective secure communication links between the device and the IED(s). However, the device may continue to communicate data with the IED(s) even though the respective secure communication link was not successfully established. Furthermore, the device may output a notification in response to a determination that any of the respective secure communication links were not successfully established. For example, the notification may inform a user that further action is to be performed to establish the respective secure communication link(s).

At block 442, in response to a determination that any of the respective secure communication link were successfully established, the device may communicate data with the corresponding IED(s) via the respective secure communication link(s). As an example, the device may generate or receive a CAK and/or a SAK via the MKA protocol. The device may use the SAK to encrypt data to be transmitted to one of the IED(s) via the respective secure communication link and/or to decrypt encrypted data received from one of the IED(s) via the respective secure communication link.

Figure 10:
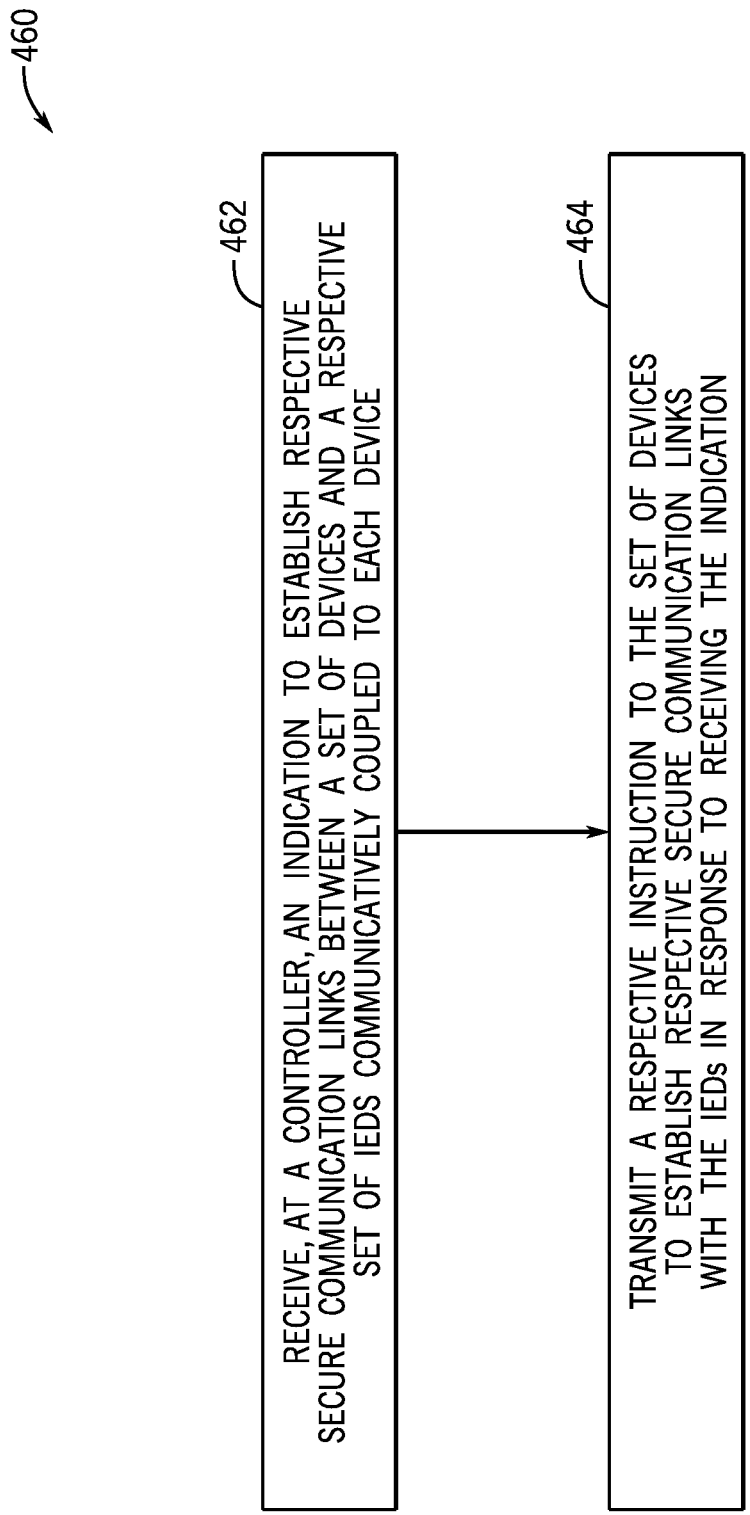
FIG. 10 is a flowchart of an embodiment of a method for communicating with a set of switches to transition IEDs from a passive mode to an active mode, in accordance with an aspect of the present disclosure.

FIG. 10 is a flowchart of an embodiment of a method 460 for establishing secure communication links with IEDs. The method 460 is described from the perspective of a controller (e.g., the communications controller 180, the controller 342) that may be communicatively coupled to a set of devices that are further communicatively coupled to a respective set of IEDs. However, a method similar to the method 400 may be performed by any other device of the electric power distribution system 100.

At block 462, the controller may receive an indication to establish respective secure communication links between the device(s) and the IED(s). For example, the indication may include a user input and/or a parameter detected by the controller. At block 464, in response to receipt of the indication, the controller may transmit a respective instruction to each device to establish the respective secure communication links between the device(s) and the IED(s). That is, the instruction transmitted by the instruction may cause the device(s) to transmit the activation data that causes the IED(s) to transition from the passive mode to the active mode.

In certain embodiments, the controller may transmit the instructions within a threshold period of time to each of the device(s) communicatively coupled to the controller. Thus, each of the device(s) may transmit the activation data within the threshold period of time to establish the respective secure communication links. In additional or alternative embodiments, the controller may transmit the instructions to a subset of the device(s) and not a remainder of the device(s). In this manner, the subset of the device(s) may transmit the activation data to establish the respective secure communication links, and the remainder of the device(s) may not transmit the activation data and may not establish the respective secure communication links. In further embodiments, the instructions transmitted by the controller may instruct the device(s) to transmit the activation data to a subset of the IED(s) and not a remainder of the IED(s). As such, the respective secure communication links may be established between the device(s) and the subset of the IED(s).

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. An intelligent electronic device (IED) of an electric power distribution system, the IED comprising:
   processing circuitry; and
   a memory comprising instructions, wherein the instructions, when executed by the processing circuitry, are configured to cause the processing circuitry to perform operations comprising:
      operating in a passive mode to communicate data before initiation of a media access control security key agreement (MKA) protocol;
      monitoring a duration of time operating in the passive mode;
      when, during operation in the passive mode while the duration of time is within a threshold period of time, activation data indicative that a media access control security (MACsec) communication link is to be established is received:
         operating in an active mode using the MKA protocol to establish the MACsec communication link; and
         communicating data via the MACsec communication link; and
      when the activation data is not received within the threshold period of time during operation in the passive mode, suspending operation of the passive mode, wherein receiving the activation data during the suspension of the operation of the passive mode does not result in operating in the active mode.

2. The IED of claim 1, wherein the instructions, when executed by the processing circuitry, are configured to cause the processing circuitry to perform operations comprising:
   receiving a connectivity association key (CAK) during performance of the MKA protocol; and
   establishing an MKA connectivity association upon receipt of the CAK.

3. The IED of claim 2, wherein the instructions, when executed by the processing circuitry, are configured to cause the processing circuitry to perform operations comprising:
   receiving a security association key (SAK) via the MKA connectivity association;
   establishing the MACsec communication link via the SAK; and
   communicating data via the MACsec communication link.

4. The IED of claim 3, wherein the instructions, when executed by the processing circuitry, are configured to cause the processing circuitry to perform operations comprising:
   using the SAK to encrypt data to be transmitted via the MACsec communication link;
   using the SAK to decrypt encrypted data received via the MACsec communication link; or both.

5. The IED of claim 1, wherein the IED is communicatively coupled to an additional device of the electric power distribution system via a previously established communication link, and the instructions, when executed by the processing circuitry, are configured to cause the processing circuitry to communicate data with the additional device via the previously established communication link during operation in the passive mode.

6. The IED of claim 5, wherein the activation data is indicative that the MACsec communication link is to be established between the IED and the additional device, and the instructions, when executed by the processing circuitry, are configured to cause the processing circuitry to perform operations comprising:
   determining whether the MACsec communication link is successfully established between the IED and the additional device via the MKA protocol; and communicating data with the additional device via the previously established communication link in response to a determination that the MACsec communication link is not successfully established between the IED and the additional device.

7. The IED of claim 1, wherein the instructions, when executed by the processing circuitry, are configured to cause the processing circuitry to operate in the active mode to initiate the MKA protocol based on setup criteria.

8. A tangible, non-transitory, computer- readable medium comprising instructions, wherein the instructions, when executed by processing circuitry, are configured to cause the processing circuitry to perform operations comprising:
  operating in a passive mode to communicate data before initiation of a media access control security key agreement (MKA) protocol;
  monitoring a duration of time operating in the passive mode;
  receiving an indication to establish a media access control security (MACsec) communication link with an intelligent electronic device (IED) of an electric power distribution system;
  transmitting activation data to the IED in response to receipt of the indication, wherein the activation data is configured to cause the IED to transition from a passive mode in which data is communicated with the IED without use of the MACsec communication link to an active mode in which a MACsec key agreement (MKA) protocol is initiated to establish the MACsec communication link;
  when the activation data is received during operation in the passive mode while the duration of time is within a threshold period of time:
    initiating the MKA protocol;
    operating in the active mode using the MKA protocol to establish the MACsec communication link; and
    communicating data via the MACsec communication link; and
  when the activation data is not received during operation in the passive mode within the threshold period of time, suspending operation of the passive mode, wherein receiving activation data during suspension of operation of the passive mode does not result in operating in the active mode.

9. The tangible, non-transitory, computer-readable medium of claim 8, wherein the instructions, when executed by the processing circuitry, are configured to cause the processing circuitry to perform operations comprising:
  determining whether the MACsec communication link is successfully established with the IED via the MKA protocol; and
  communicating data with the IED via the MACsec communication link based on a determination that the MACsec communication link is successfully established with the IED.

10. The tangible, non-transitory, computer-readable medium of claim 8, wherein the instructions, when executed by the processing circuitry, are configured to cause the processing circuitry to perform operations comprising:
  identifying an MKA frame broadcasted by the IED upon initiating the MKA protocol;
  determining that the MKA frame was generated via an expected key; and
  establishing an adoption link with the IED to complete establishment of the MACsec communication link in response to a determination that the MKA frame was generated via the expected key.

11. The tangible, non-transitory, computer-readable medium of claim 8, wherein the instructions, when executed by the processing circuitry, are configured to cause the processing circuitry to perform operations comprising:
  identifying an MKA frame broadcasted by the IED upon initiating the MKA protocol;
  determining that the MKA frame was not generated via an expected key; and
  blocking establishment of the MACsec communication link in response to a determination that the MKA frame was not generated via the expected key.

12. The tangible, non-transitory, computer-readable medium of claim 8, wherein the activation data comprises a data packet, an MKA frame, a passcode, an identifier, a key, or any combination thereof.

13. The tangible, non-transitory, computer-readable medium of claim 8, wherein the instructions, when executed by the processing circuitry, are configured to receive the indication based on a user input, a detected parameter, an instruction transmitted by a controller, or any combination thereof.

14. The tangible, non-transitory, computer-readable medium of claim 8, wherein the instructions, when executed by the processing circuitry, are configured to cause the processing circuitry to perform operations comprising:
  transmitting the activation data to an additional IED in response to receipt of the indication to cause the additional IED to transition from an additional passive mode to an additional active mode; and
  initiating the MKA protocol upon transmitting the activation data to the additional IED to establish an additional MACsec communication link with the additional IED.

15. A system, comprising:
  an intelligent electronic device (IED) configured to:
    operate in a passive mode to communicate data before initiation of a media access control security key agreement (MKA) protocol;
    monitor a duration of time operating in the passive mode;
    when, during operation in the passive mode while the duration of time is within a threshold period of time, activation data indicative that a media access control security (MACsec) communication link is to be established is received:
      operate in an active mode using the MKA protocol to establish the MACsec communication link; and
      communicate data via the MACsec communication link; and
    when the activation data is not received within the threshold period of time during operation in the passive mode, suspend operation of the passive mode, wherein receiving the activation data during the suspension of the operation of the passive mode does not result in operating in the active mode;
  a switch communicatively coupled to the IED; and
  a controller configured to perform operations comprising:
    receiving an indication to establish the MACsec communication link between the switch and the IED; and
    transmitting an instruction to the switch in response to receipt of the indication, wherein the instruction causes the switch to transmit the activation data to the IED to cause the IED to transition from the passive mode to the active mode to initiate the MKA protocol to establish the MACsec communication link.

16. The system of claim 15, comprising:
an additional IED configured to operate in an additional passive mode; and
an additional switch communicatively coupled to the additional IED, wherein the controller is configured to transmit an additional instruction to the additional switch in response to receipt of the indication, and the additional instruction causes the additional switch to transmit additional activation data to the additional IED to cause the additional IED to transition from the additional passive mode to an additional active mode to initiate the MKA protocol to establish an additional MACsec communication link between the additional IED and the additional switch.

17. The system of claim 15, wherein the switch is configured to perform operations comprising:
receiving the instruction transmitted by the controller;
transmitting the activation data to the IED in response to receiving the instruction;
initiating the MKA protocol upon transmitting the activation data to the IED; and
establishing the MACsec communication link between the switch and the IED via the MKA protocol.

18. The system of claim 15, wherein IED is configured to perform operations comprising:
communicating data via a previously established communication link between the switch and the IED during operation in the passive mode;
receiving the activation data transmitted by the switch;
transitioning from the passive mode to the active mode in response to receipt of the activation data to initiate the MKA protocol to establish the MACsec communication link between the switch and the IED; and
communicating data via the MACsec communication link instead of via the previously established communication link upon establishment of the MACsec communication link.

19. The system of claim 15, wherein the controller is configured to receive the indication based on a user input.

* * * * *